United States Patent
Zeng et al.

(10) Patent No.: US 11,770,524 B2
(45) Date of Patent: Sep. 26, 2023

(54) LOOP FILTER UTILIZED IN ENCODER AND ASSOCIATED SIGNAL PROCESSING METHOD

(71) Applicant: Realtek Semiconductor Corp., HsinChu (TW)

(72) Inventors: Weimin Zeng, Milpitas, CA (US); Chi-Wang Chai, Cupertino, CA (US); Wei Li, Suzhou (CN); Rong Zhang, Suzhou (CN); Wujun Chen, Suzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/524,708

(22) Filed: Nov. 11, 2021

(65) Prior Publication Data

US 2023/0141735 A1    May 11, 2023

(51) Int. Cl.
*H04N 19/117* (2014.01)
*H04N 19/147* (2014.01)
*H04N 19/176* (2014.01)
*H04N 19/82* (2014.01)

(52) U.S. Cl.
CPC ......... *H04N 19/117* (2014.11); *H04N 19/147* (2014.11); *H04N 19/176* (2014.11); *H04N 19/82* (2014.11)

(58) Field of Classification Search
CPC .. H04N 19/117; H04N 19/172; H04N 19/147; H04N 19/176; H04N 19/82; H04N 19/124; H04N 19/86
See application file for complete search history.

(56) References Cited

U.S. PATENT DOCUMENTS

| | | | |
|---|---|---|---|
| 2019/0045186 A1* | 2/2019 | Zhang | H04N 19/172 |
| 2019/0052877 A1 | 2/2019 | Zhang | |
| 2022/0038726 A1* | 2/2022 | Kuo | H04N 19/105 |
| 2022/0086472 A1* | 3/2022 | Zhao | H04N 19/117 |
| 2022/0256167 A1* | 8/2022 | Garg | H04N 19/159 |
| 2022/0303584 A1* | 9/2022 | Du | H04N 19/186 |
| 2023/0071018 A1* | 3/2023 | Tang | H04N 19/174 |

FOREIGN PATENT DOCUMENTS

| | | | | |
|---|---|---|---|---|
| WO | WO-2022040428 A1 | * | 2/2022 | |
| WO | WO-2022046903 A1 | * | 3/2022 | |
| WO | WO-2022066783 A1 | * | 3/2022 | |
| WO | WO-2022125151 A1 | * | 6/2022 | H04N 19/103 |

* cited by examiner

*Primary Examiner* — Dramos Kalapodas
(74) *Attorney, Agent, or Firm* — Winston Hsu

(57) ABSTRACT

A loop filter utilized in an encoder includes a constrained directional enhancement filter and a decision circuit. The constrained directional enhancement filter is arranged to process multiple frames, wherein for a first frame in the multiple frames, the constrained directional enhancement filter determines a best filter strength of each block in the first frame in a first filter strength list, and determines a second filter strength list according to content of the first frame. The decision circuit is coupled to the constrained directional enhancement filter, and is arranged to record which index in the first filter strength list is the best filter strength corresponding to each block in the first frame, and provide the first filter strength list and the index corresponding to each block to an encoding circuit of the encoder as an output of the encoder.

14 Claims, 8 Drawing Sheets

Primary filter taps $d = 0$ $d = 1$ $d = 2$ $d = 3$

Secondary filter taps

| | | $\frac{1}{16}$ | | |
|---|---|---|---|---|
| | | | $\frac{2}{16}$ | $\frac{1}{16}$ |
| | $\frac{2}{16}$ | ▨ | $\frac{2}{16}$ | |
| $\frac{1}{16}$ | | $\frac{2}{16}$ | | |
| | | $\frac{1}{16}$ | | |

$d = 3, 7$

| $\frac{1}{16}$ | | | | $\frac{1}{16}$ |
|---|---|---|---|---|
| | | | $\frac{2}{16}$ | |
| | $\frac{2}{16}$ | ▨ | $\frac{2}{16}$ | |
| | | $\frac{2}{16}$ | | |
| $\frac{1}{16}$ | | | | $\frac{1}{16}$ |

$d = 2, 6$

| | | | | $\frac{1}{16}$ |
|---|---|---|---|---|
| $\frac{1}{16}$ | | $\frac{2}{16}$ | | |
| | $\frac{2}{16}$ | ▨ | $\frac{2}{16}$ | |
| | | $\frac{2}{16}$ | | $\frac{1}{16}$ |
| | $\frac{1}{16}$ | | | |

$d = 1, 5$

| | | $\frac{1}{16}$ | | |
|---|---|---|---|---|
| | | $\frac{2}{16}$ | | |
| $\frac{1}{16}$ | $\frac{2}{16}$ | ▨ | $\frac{2}{16}$ | $\frac{1}{16}$ |
| | | $\frac{2}{16}$ | | |
| | | $\frac{1}{16}$ | | |

LOOP FILTER UTILIZED IN ENCODER AND ASSOCIATED SIGNAL PROCESSING METHOD

BACKGROUND OF THE INVENTION

1. Field of the Invention

The present invention is related to a video encoder, and more particularly, to a loop filter utilized in an encoder and associated signal processing method.

2. Description of the Prior Art

In the AOMedia Video 1 (AV1) video coding format formulated by AOMedia, a constrained directional enhancement filter (CDEF) is utilized to remove encoding artifacts in the video encoder, to improve image quality. In the operations of the CDEF, for each block in the frame (e.g. a block including 64*64 pixels), the CDEF utilizes 64 different filter strengths to perform filter operations upon the block, to generate 64 filter results. Then, the CDEF calculates a mean-square error (MSE) between each filter result and the original luma of the block, and selects the filter strength corresponding to the filter result with the smallest MSE as a best filter strength of the block. Next, after the best filter strength of each block is determined, a filter strength list at a frame level is established according to these best filter strengths. The length of the filter strength list mentioned in the AV1 specification may be 1, 2, 4, or 8. That is, the filter strength list may only include 1, 2, 4, or 8 filter strengths.

Specifically, after the MSEs of all blocks in the entire frame are calculated, the filter strength lists of the above-mentioned four lengths will be established according to the MSEs and the best filter strengths of multiple blocks, and a rate-distortion cost (RD cost) of each filter strength list is calculated accordingly. Afterward, the filter strength list with the smallest RD cost is selected as a final filter strength list. After the final filter strength list is determined, each block in the frame needs to select a best filter strength from the final filter strength list again, and records which index in the final filter strength list is the best filter strength corresponding to each block. Finally, the final filter strength list and the index corresponding to each block will be brought into the stream and transmitted to other electronic devices or other components.

However, since the above-mentioned encoding method needs to wait for all blocks in the frame to complete the calculation of the mean-square error before determining the final filter strength list, it is not suitable to be implemented by hardware due to the consideration of signal delay. In addition, since each block has to undergo filtering with 64 different filter strengths, each block has to calculate 64 mean-square errors, and the final filter strength list is selected from four filter strength lists, the amount of calculation is too large. As a result, it is difficult to utilize hardware to complete real-time encoding.

SUMMARY OF THE INVENTION

It is therefore one of the objectives of the present invention to provide an encoder and associated encoding method, which may effectively determine the filter strength list and complete operations of the constrained directional enhancement filter, to address the above-mentioned issues.

According to one embodiment of the present invention, a loop filter utilized in an encoder is provided, wherein the loop filter includes a constrained directional enhancement filter and a decision circuit. The constrained directional enhancement filter is arranged to process multiple frames, wherein for a first frame in the multiple frames, the constrained directional enhancement filter determines a best filter strength of each block in the first frame in a first filter strength list, and determines a second filter strength list according to content of the first frame; and for a second frame in the multiple frames, the constrained directional enhancement filter determines a best filter strength of each block in the second frame in the second filter strength list, and determines a third filter strength according to content of the second frame. The decision circuit is coupled to the constrained directional enhancement filter, and is arranged to record which index in the first filter strength list is the best filter strength corresponding to each block in the first frame, and provide the first filter strength list and the index corresponding to each block to an encoding circuit of the encoder as an output of the encoder.

According to another embodiment of the present invention, a signal processing method utilized in an encoder is provided. The signal processing method includes: receiving multiple frames in sequence; for a first frame in the multiple frames, determining a best filter strength of each block in the first frame in a first filter strength list, and determining a second filter strength list according to content of the first frame; recoding which index in the first filter strength list is the best filter strength corresponding to each block in the first frame, and providing the first filter strength list and the index corresponding to each block to an encoding circuit of the encoder as the output of the encoder; and for a second frame in the multiple frames, determining a best filter strength of each block in the second frame in the second filter strength list, and determining a third filter strength list according to content of the second frame.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 and FIG. 5 are diagrams illustrating primary filter taps corresponding to different directions mentioned in the AV1 video coding format.

FIG. 6 is a diagram illustrating secondary filter taps mentioned in the AV1 video coding format.

DETAILED DESCRIPTION

Figure 1:
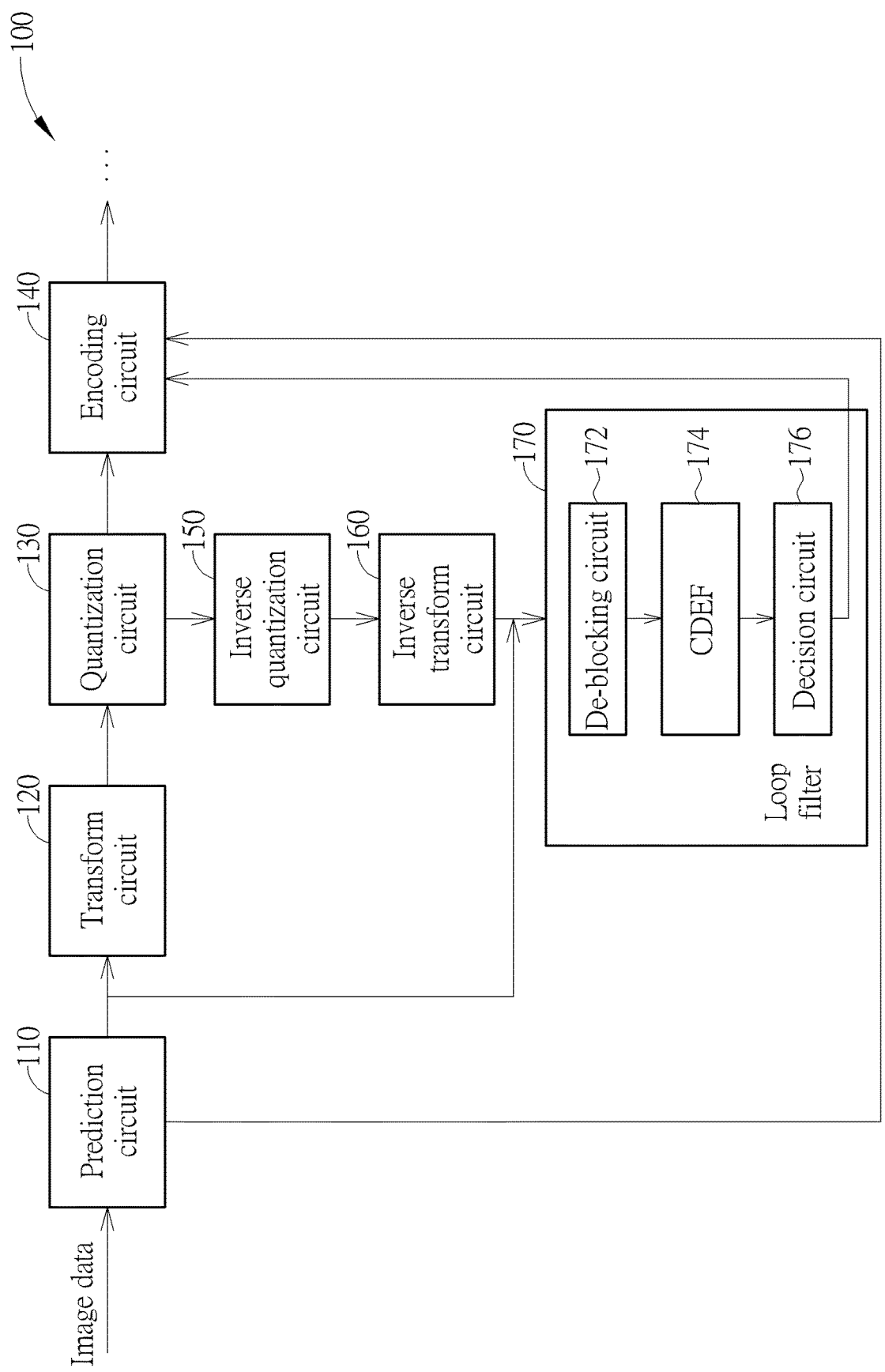
FIG. 1 is a diagram illustrating an encoder according to an embodiment of the present invention.

FIG. 1 is a diagram illustrating an encoder 100 according to an embodiment of the present invention. As shown in FIG.

1, the encoder 100 includes a prediction circuit 110, a transform circuit 120, a quantization circuit 130, an encoding circuit 140, an inverse quantization circuit 150, an inverse transform circuit 160, and a loop filter 170, wherein the loop filter 170 includes a de-blocking circuit 172, a constrained directional enhancement filter (CDEF) 174, and a decision circuit 176. In this embodiment, the encoder 100 supports the AV1 video coding format formulated by AOMedia.

In the main operation of the encoder 100, the prediction circuit 110 is arranged to receive the external image data (e.g. the image frame) and the interpolated frame or the predicted image data that are generated inside the encoder 100, to generate the predicted image data and the residual error data. Specifically, the prediction circuit 110 may be arranged to divide the received frame into multiple blocks, and perform inter-frame prediction, intra-frame prediction, motion estimation, and/or motion compensation upon the multiple blocks, to generate the predicted image data and multiple residual error data that correspond to the multiple blocks, respectively. Then, the transform circuit 120 performs discrete cosine transform (DCT) upon the multiple residual error data, to transform the residual error data into the frequency-domain data. Afterward, the quantization circuit 130 performs a quantization operation upon the frequency-domain data generated by the transform circuit 120, to generate a quantized data, wherein the quantization operation of each frame corresponds to a quantization parameter. The encoding circuit 140 is arranged to process the quantized data to generate an encoded data, and transmit the encoded data to a decoder (not shown) through the back-end channel.

In addition, the inverse quantization circuit 150 is arranged to perform an inverse quantization operation upon the quantized data generated by the quantization circuit 130, and the inverse transform circuit 160 is arranged to perform an inverse transform operation (e.g. an inverse DCT) upon the output of the inverse quantization circuit 150, to generate an inverse transformed residual error data. Afterward, the predicted image data generated by the prediction circuit 110 is added to the inverse transformed residual error data generated by the inverse transform circuit 160, to generate and output an input image data to the loop filter 170. The residual error data will be distorted during the operations of the transform circuit 120, the quantization circuit 130, the inverse quantization circuit 150, and the inverse transform circuit 160, and the prediction circuit 110 utilizes a block as a basic unit for image processing. As a result, compared with the original image data, the input image data will have some differences in texture. The loop filter 170 may be arranged to reduce these differences.

It should be noted that, the operations of the prediction circuit 110, the transform circuit 120, the quantization circuit 130, the encoding circuit 140, the inverse quantization circuit 150, and the inverse transform circuit 160 in the encoder 100 are well known to those with ordinary knowledge in the art, and the focus of the present invention is on the de-blocking circuit 172, the CDEF 174, and the decision circuit 176 in the loop filter 170. As a result, the following content mainly describes the loop filter 170.

Figure 2:
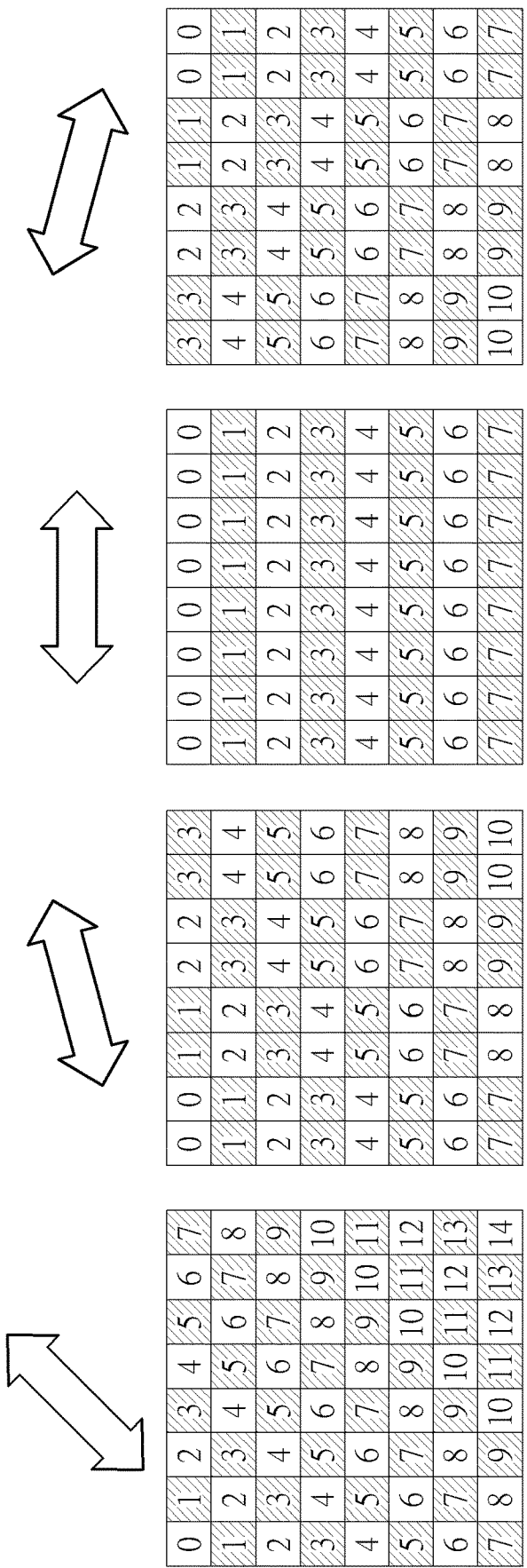
FIG. 2 and FIG. 3 are diagrams illustrating direction search for blocks of a constrained directional enhancement filter mentioned in the AV1 video coding format.
Figure 3:
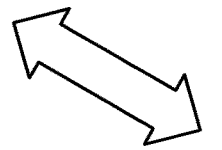
Figure 3:
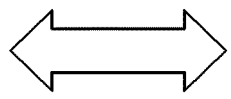
Figure 3:
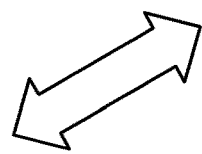
Figure 3:
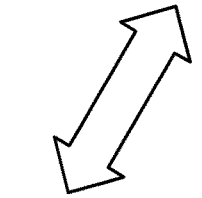
Figure 4:
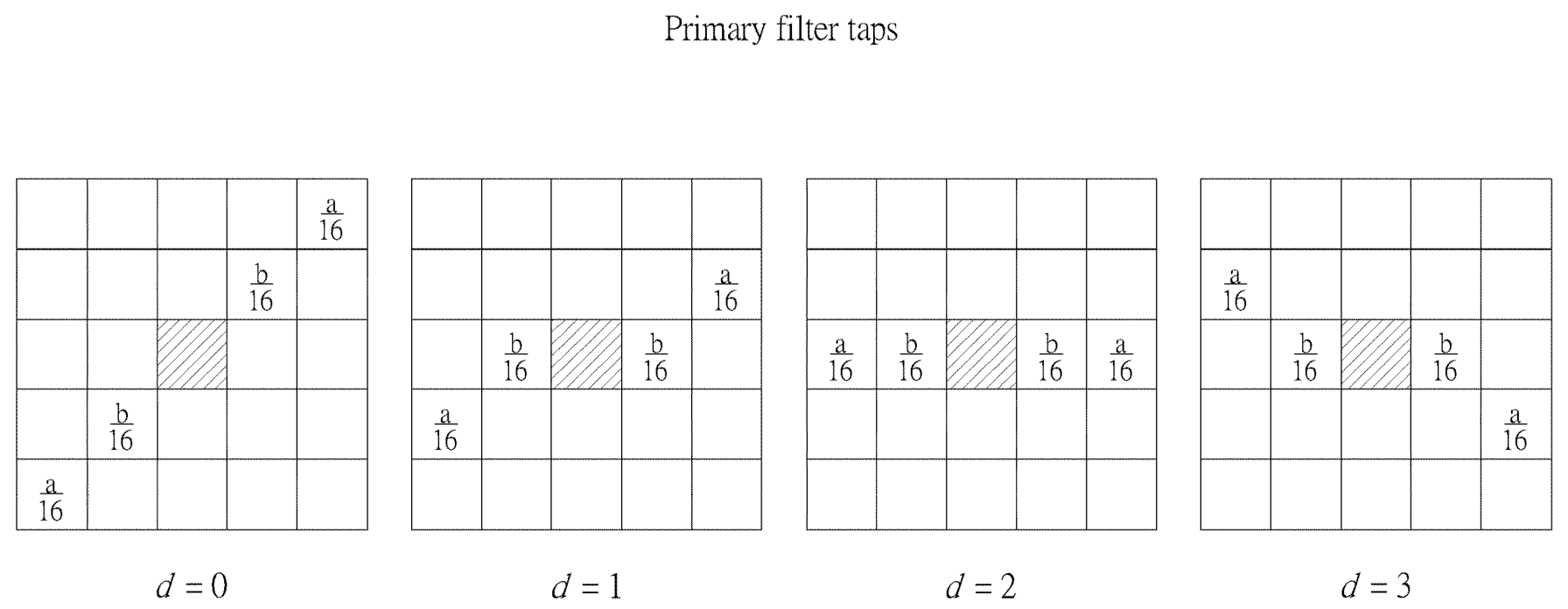
Figure 5:
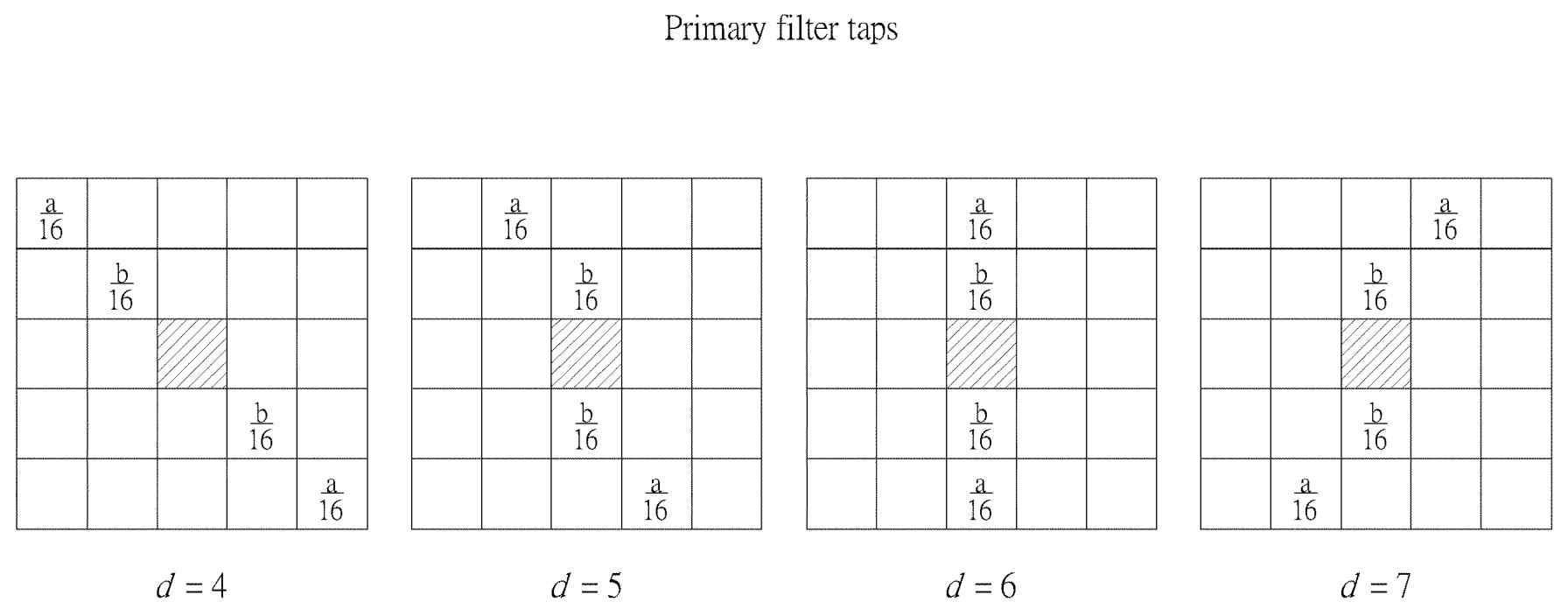

In the operation of the loop filter 170, the de-blocking circuit 172 is arranged to perform a filter operation upon the input image data, to eliminate the blocking effect at the block boundary that is caused by the quantization error, wherein the de-blocking circuit 172 has three main tasks, namely, boundary strength calculation, boundary analysis, and filter implementation. Since the de-blocking circuit 172 is commonly utilized in a block-based codec, the details are not described here for brevity. Regarding the operation of the CDEF 174, please refer to FIG. 2 and FIG. 3 first. The direction search for the block is mentioned in the specification of the AV1 video coding format, to determine which of the eight different directions d=0-7 that the texture of the block belongs to. Then, please refer to FIGS. 4-6. The primary filter taps and the secondary filter taps that are correspond to different directions are also mentioned in the specification of the AV1 video coding format. In the primary filter taps, the values a and b shown in FIG. 4 and FIG. 5 may be (2, 4) or (3, 3) according to the strength classification. Since the primary filter taps have 16 filter strengths and the secondary filter taps have 4 filter strengths, it may be considered that there are 64 filter strengths (i.e. 16 primary filter taps multiplied by 4 secondary filter taps).

However, as described in the prior art, since the selection of 64 filter strengths is too complicated for the operation of the CDEF 174, this embodiment only selects apart of the filter strengths for subsequent operations, to reduce the complexity of the circuit design and further achieve the purpose of real-time processing. In the following examples, 5 primary filter taps and 2 secondary filter taps are selected for illustration. That is, only 10 filter strengths (i.e. 5 primary filter taps multiplied by 2 secondary filter taps) are used in this embodiment. Any suitable method may be utilized for the selection of the 5 primary filter taps and the 2 secondary filter taps, such as an equidistant selection method, but the present invention is not limited thereto.

In the operation of the CDEF 174, each frame directly utilizes the filter strength list that is determined by the CDEF 174 and the decision circuit 176 when processing the previous frame, to determine a best filter strength corresponding to each block of the frame. At the same time, the CDEF 174 will also simultaneously utilize the preset 10 different filter strengths to perform a filter operation upon the block, to generate 10 filter results. Then, the CDEF 174 calculates a mean-square error (MSE) between each filter result and the original luma of the block, and selects the filter strength corresponding to the filter result with the smallest MSE as the best filter strength of the block. After the best filter strength of each block is determined, a filter strength list for the next frame is established according to these best filter strengths, wherein the length of the filter strength list may be determined by the rate-distortion cost (RD cost) described in the prior art.

Figure 7:
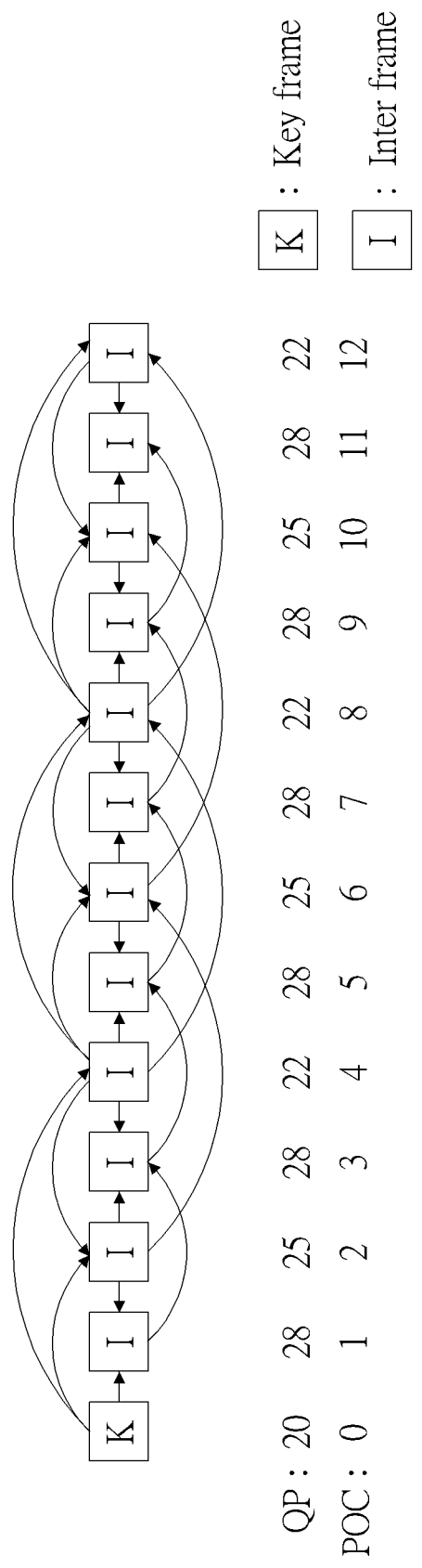
FIG. 7 is a diagram illustrating multiple frames referring to a filter strength list of the previous frame according to an embodiment of the present invention.

Specifically, please refer to FIG. 7 that illustrates multiple frames and corresponding quantization parameters (QPs) and picture order counts (POCs), wherein the multiple frames includes a key frame and multiple inter frames, and the inter frames may be generated according to contents of other frames. The arrows illustrated at the top of FIG. 7 indicate that the inter frames are generated by referring to which frame contents. For example, the frame content with POC equal to 2 may be generated according to the frame content with POC equal to 0 and the frame content with POC equal to 4. In the operation of the loop filter 170, when the key frame with POC equal to 0 starts to be processed, the CDEF 174 may perform table lookup according to the QP "20" of the key frame, to obtain a filter strength list (e.g. the first filter strength list), wherein the filter strength list includes one or more filter strengths in the above-mentioned 10 filter strengths.

Assuming that the filter strength list includes 4 different filter strengths, the CDEF 174 utilizes the 4 different filter strengths to perform a filter operation upon each block in the key frame, to generate 4 filter results. Afterward, the CDEF 174 calculates the MSE between each filter result and the original luma of the block (i.e. the input image data input into the loop filter 170 or the output of the de-blocking circuit 172), and selects the filter strength corresponding to the filter result with the smallest MSE as the best filter strength of the block. After the best filter strength of each block is determined, the decision circuit 176 records which index in the filter strength list is the best filter strength corresponding to each block. Finally, the filter strength list and the index corresponding to each block are transmitted to the encoding circuit 140, brought into the stream, and transmitted to other electronic devices or other components.

In addition, the CDEF 174 will also simultaneously utilize the preset 10 different filter strengths to perform the filter operation upon each block in the key frame with POC equal to 0, to generate 10 filter results. Afterward, the CDEF 174 calculates the MSE between each filter result and the original luma of the block, and selects the filter strength corresponding to the filter result with the smallest MSE as the best filter strength of the block. After the best filter strength of each block is determined, multiple candidate strength lists with different lengths are established according to the MSEs and the best filter strengths of the multiple blocks, respectively, and the RD cost of each filter strength list is calculated accordingly. Afterward, the candidate filter strength list with the smallest RD cost is selected as the filter strength list.

When the inter frame with POC equal to 1 starts to be processed, the CDEF 174 may perform table lookup according to the QP "28" of the inter frame, to obtain a filter strength list (e.g. a filter strength list that only includes 2 different filter strengths). The best filter strength of each block may be obtained through an operation similar to the above-mentioned operation of the key frame. The decision circuit 176 records which index in the filter strength list is the best filter strength corresponding to each block, and transmits the filter strength list and the index corresponding to each block to the encoding circuit 140, to transmit the filter strength list and the index corresponding to each block to other electronic devices or other components. In addition, the CDEF 174 will also simultaneously utilize the preset 10 different filter strengths to perform the filter operation upon each block in the inter frame with POC equal to 1, to determine its own filter strength list.

When the inter frame with POC equal to 2 starts to be processed, the processing method is the same as the processing method of the inter frame with POC equal to 1 and the processing method of the key frame with POC equal to 0.

When the inter frame with POC equal to 3 starts to be processed, since the corresponding QP "28" of the inter frame with POC equal to 3 is the same as that of the inter frame with POC equal to 1, the inter frame with POC equal to 3 may directly utilizes the filter strength list determined by processing the inter frame with POC equal to 1 (e.g. the filter strength list that only includes 2 different filter strengths). The CDEF 174 directly utilizes the 2 different filter strengths to perform the filter operation upon each block in the inter frame, to generate 2 filter results. Then, the CDEF 174 calculates the MSE between each filter result and the original luma of the block (e.g. the input image data input into the loop filter 170 or the output of the de-blocking circuit 172), and selects the filter strength corresponding to the filter result with the smallest MSE as the best filter strength of the block. Afterward, the decision circuit 176 records which index in the filter strength list is the best filter strength corresponding to each block, and transmits the filter strength list and the index corresponding to each block to the encoding circuit 140, to transmit the filter strength list and the index corresponding to each block to other electronic devices or other components.

In addition, at the same time the CDEF 174 and the decision circuit 176 directly utilize the filter strength list determined by processing the inter frame with POC equal to 1 to process the inter frame with POC equal to 3 for obtaining the best filter strength of each block, the CDEF 174 will also simultaneously utilize the preset 10 different filter strengths to perform the filter operation upon each block in the inter frame with POC equal to 3, to generate 10 filter results. Afterward, the CDEF 174 calculates the MSE between each filter result and the original luma of the block, and selects the filter strength corresponding to the filter result with the smallest MSE as the best filter strength of the block. After the best filter strength of each block is determined, multiple candidate strength lists with different lengths are established according to the MSEs and the best filter strengths of the multiple blocks, respectively, and the RD cost of each filter strength list is calculated accordingly. Afterward, the candidate filter strength list with the smallest RD cost is selected as the filter strength list.

To put it simply, when the inter frame with POC equal to 3 starts to be processed, the CDEF 174 and the decision circuit 176 will directly utilize the filter strength list determined by processing the inter frame with POC equal to 1 to process the inter frame with POC equal to 3. That is, the best filter strength of each block transmitted by the stream is selected through referring to the filter strength list determined by the inter frame with POC equal to 1. In the above-mentioned operation, since the filter strength list of the inter frame with POC equal to 3 does not need to be determined first when the inter frame with POC equal to 3 is processed, the encoding operation may be speeded up. In addition, since the inter frame with POC equal to 3 is very close to the inter frame with POC equal to 1, the image content will not change too much. As a result, the above-mentioned operation will not cause too many errors or distortions in the image processing. On the other hand, when the inter frame with POC equal to 3 is processed, the most suitable filter strength list for the inter frame with POC equal to 3 will be generated at the same time. This filter strength list is not for the inter frame with POC equal to 3 but the subsequent frame.

When the inter frame with POC equal to 4 starts to be processed, the processing method is the same as the processing method of the frames with POCs equal to 0, 1, and 2.

When the inter frame with POC equal to 5 starts to be processed, the processing method of the inter frame with POC equal to 5 is similar to that of the inter frame with POC equal to 3. To put it simply, since the QP "28" corresponding to the inter frame with POC equal to 5 is the same as that corresponding to the inter frame with POC equal to 3, the CDEF 174 and the decision circuit 176 will directly utilize the filter strength list determined by processing the inter frame with POC equal to 3 to process the inter frame with POC equal to 5. That is, the best filter strength of each block transmitted by the stream is selected through referring to the filter strength list determined by the inter frame with POC equal to 3. In addition, when the inter frame with POC equal to 5 is processed, the most suitable filter strength list for the inter frame with POC equal to 5 will be generated. This filter strength list is not for the inter frame with POC equal to 5 but the subsequent frame.

The operation of subsequent process of the frames with POCs equal to 6-12 may refer to the above. That is, the subsequent process of each of the frames with POCs equal to 6-12 may directly utilize the filter strength list determined by the previous frame to determine the best filter strength for each block of its own frame, wherein the previous frame is the frame that has the same quantization parameter and is closest to its own frame. At the same time, the most suitable filter strength list for its own frame is generated for the subsequent frame. The arrows at the bottom of FIG. 7 illustrate a filter strength list determined by which previous frame should be referred to for processing a current frame.

Figure 8:
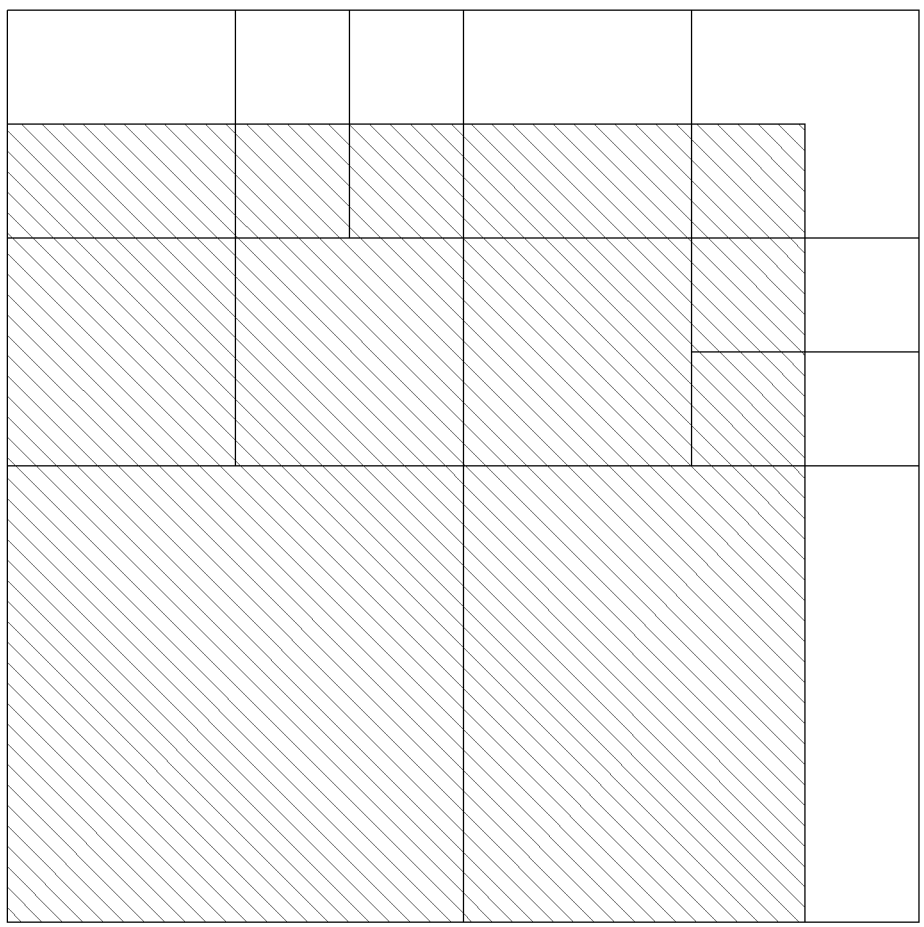
FIG. 8 is a diagram illustrating the constrained directional enhancement filter utilizing the luma value before being processed by the de-blocking circuit and the luma value after being processed by the de-blocking circuit to perform computation.

In one embodiment, in order not to affect the parallel operation of the pipeline, when the CDEF 174 calculates the MSE for the block, the upper left area of the block utilizes the luma values after being processed by the de-blocking circuit 172, and the remaining area of the block utilizes the luma values before being processed by the de-blocking circuit 172. For example, please refer to FIG. 8. FIG. 8 illustrates a block having 64*64 pixels, wherein when the CDEF 174 calculates the MSE for the block, the 56*56 pixels in the slanted area utilize the luma values after being processed by the de-blocking circuit 172, and the blank area utilizes the luma values before being processed by the de-blocking circuit 172. The reason for this design is that the de-blocking circuit 172 of this embodiment needs to perform offset with 8 pixels to the upper left during operation. As a result, the CDEF 174 may not be able to obtain the luma values after being processed by the de-blocking circuit 172 in time when processing the blank area shown in FIG. 8. However, the present invention is not limited thereto.

It should be noted that, luma values of pixels are utilized for illustration in the above examples. The loop filter 170 will also process the chroma values at the same time during operation, however. The processing method for the chroma values is similar to that for the luma values as described above.

In summary, in the loop filter utilized in the encoder and associated signal processing method of the present invention, by utilizing the filter strength list of the previous frame to process the current frame, and determining the filter strength list of the current frame for the sequent frame at the same time, the parallel computation may be performed effectively, and the purpose of real-time encoding may be achieved. In addition, the real-time encoding may be implemented by the hardware circuit.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A loop filter utilized in an encoder, comprising:
a constrained directional enhancement filter, arranged to process multiple frames, wherein for a first frame in the multiple frames, the constrained directional enhancement filter determines a best filter strength of each block in the first frame in a first filter strength list, and determines a second filter strength list according to content of the first frame; and for a second frame in the multiple frames, the constrained directional enhancement filter determines a best filter strength of each block in the second frame in the second filter strength list, and determines a third filter strength according to content of the second frame; and
a decision circuit, coupled to the constrained directional enhancement filter, and arranged to record which index in the first filter strength list is the best filter strength corresponding to each block in the first frame, and provide the first filter strength list and the index corresponding to each block to an encoding circuit of the encoder as an output of the encoder;
wherein the constrained directional enhancement filter utilizes multiple preset filter strengths to perform a filter operation upon each block in the first frame to generate multiple filter results, and determines the second filter strength list according to the multiple filter results of each block in the first frame.

2. The loop filter of claim 1, wherein when a quantization parameter corresponding to the first frame is different from quantization parameters of frames that are before the first frame in the multiple frames, the constrained directional enhancement filter selects the first filter strength list by table lookup.

3. The loop filter of claim 1, wherein the constrained directional enhancement filter does not utilize the second filter strength list to determine the best filter strength of each block in the first frame in the first filter strength list.

4. The loop filter of claim 1, wherein the second frame is after the first frame, and the second frame and the first frame correspond to a same quantization parameter.

5. The loop filter of claim 4, wherein the constrained directional enhancement filter does not utilize the third filter strength list to determine the best filter strength of each block in the second frame in the second filter strength list.

6. The loop filter of claim 1, wherein the constrained directional enhancement filter utilizes different preset filter strengths to perform a filter operation upon each block in the first frame to generate multiple filter results, calculates a mean-square error between each filter result and original luma of corresponding block, and for each block in the first frame, selects a filter strength corresponding to a filter result with a smallest mean-square error as the best filter strength of the block.

7. The loop filter of claim 6, wherein after the best filter strength of each block in the first frame is determined, the constrained directional enhancement filter establishes a candidate filter strength list according to the mean-square error and the best filter strength of each block in the first frame, and calculates a rate-distortion cost of the candidate filter strength list, to determine the second filter strength list.

8. The loop filter of claim 1, further comprising:
a de-blocking circuit, arranged to perform de-blocking process upon the multiple frames, to generate multiple processed frames and transmit the multiple processed frames to the constrained directional enhancement filter, wherein the multiple processed frames comprise a first processed frame;
wherein the constrained directional enhancement filter determines the best filter strength of each block in the first frame in the first filter strength list according to the first frame and a partial content of the first processed frame, and determines the second filter strength list according to the first frame and the partial content of the first processed frame.

9. The loop filter of claim 8, wherein for each block in the first frame, the constrained directional enhancement filter utilizes the content of the first frame in a first area of the block, and utilizes content of the first processed frame in a second area of the block, for determining the best filter strength of the block in the first filter strength list.

10. A signal processing method utilized in an encoder, comprising:
receiving multiple frames in sequence;

for a first frame in the multiple frames, determining a best filter strength of each block in the first frame in a first filter strength list, utilizing multiple preset filter strengths to perform a filter operation upon each block in the first frame to generate multiple filter results, and determining a second filter strength list according to the multiple filter results of each block in the first frame;

recoding which index in the first filter strength list is the best filter strength corresponding to each block in the first frame, and providing the first filter strength list and the index corresponding to each block to an encoding circuit of the encoder as an output of the encoder; and for a second frame in the multiple frames, determining a best filter strength of each block in the second frame in the second filter strength list, and determining a third filter strength list according to content of the second frame.

11. The signal processing method of claim 10, wherein determining the best filter strength of each block in the first frame in the first filter strength list comprises:

in response to a quantization parameter corresponding to the first frame being different from quantization parameters of frames that are before the first frame in the multiple frames, selecting the first filter strength list by table lookup.

12. The signal processing method of claim 10, wherein determining the best filter strength of each block in the first frame in the first filter strength list comprises:

not utilizing the second filter strength list to determine the best filter strength of each block in the first frame in the first filter strength list.

13. The signal processing method of claim 10, wherein the second frame is after the first frame, and the second frame and the first frame correspond to a same quantization parameter.

14. The signal processing method of claim 13, wherein determining the best filter strength of each block in the second frame in the second filter strength list comprises:

not utilizing the third filter strength list to determine the best filter strength of each block in the second frame in the second filter strength list.

* * * * *